(No Model.)
H. T. PORTER & J. HAAS.
ATTACHING BAIL EARS TO SHEET METAL CANS OR PAILS.
No. 493,114. Patented Mar. 7, 1893.
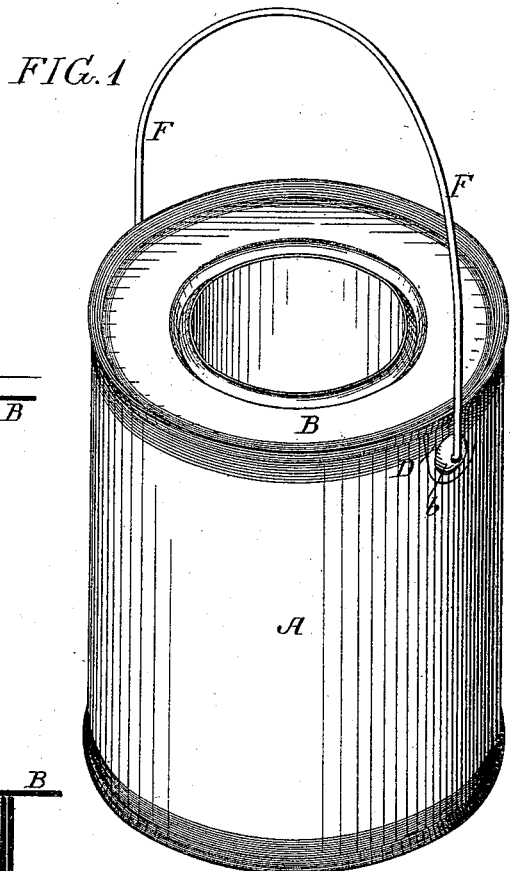
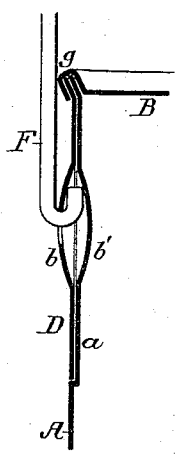
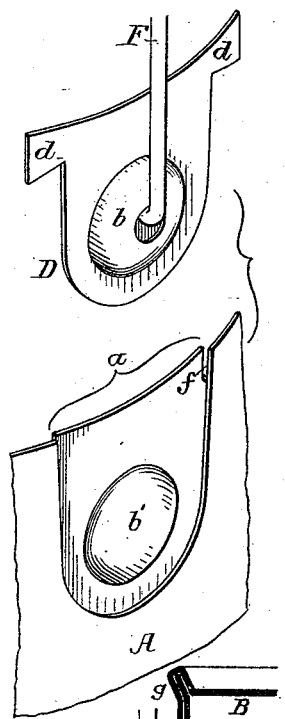
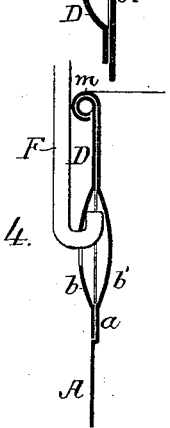
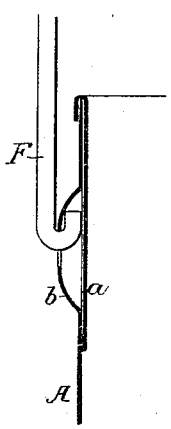
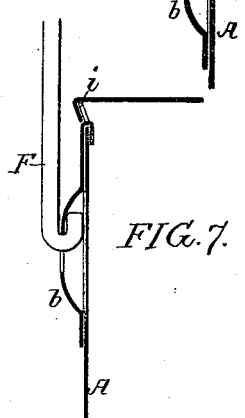
Witnesses:
Hamilton D. Turner
Alex. Barkoff
Inventors:
Harry T. Porter &
Joseph Haas
by their Attorneys
Howson & Howson

UNITED STATES PATENT OFFICE.

HARRY T. PORTER AND JOSEPH HAAS, OF PHILADELPHIA, PENNSYLVANIA, ASSIGNORS TO ISAAC PORTER AND HARRY T. PORTER, OF SAME PLACE.

ATTACHING BAIL-EARS TO SHEET-METAL CANS OR PAILS.

SPECIFICATION forming part of Letters Patent No. 493,114, dated March 7, 1893.

Application filed February 29, 1892. Serial No. 423,227. (No model.)

*To all whom it may concern:*

Be it known that we, HARRY T. PORTER and JOSEPH HAAS, citizens of the United States, and residents of Philadelphia, Pennsylvania, have invented certain Improvements in Attaching Bail-Ears to Sheet-Metal Cans or Pails, of which the following is a specification.

The object of our invention is to provide a means for readily and securely attaching bail carrying ears to cans, pails, or other sheet metal vessels, without resorting to the usual plan of soldering them in place. This object we attain in the case of open topped cans or pails by hanging the bail carrying ear upon the body of the can or pail and causing such engagement of said ear, or a portion of the same, with said body of the can or pail, or with a rim or flange turned upon the same, that the loosening or detaching of the ear when the can or pail is completed is effectually prevented. In the case of a can or pail provided with a top, the bail carrying ear may be attached to the latter, or confined by it or between it and the body, and finally secured by the same soldering operation which is resorted to in order to secure said top to the body of the can.

In the accompanying drawings: Figure 1, is a perspective view of a can having bail carrying ears applied and secured thereto in accordance with our invention. Fig. 2, is an enlarged vertical section of part of the can and bail carrying ear, part of the bail being also shown. Fig. 3, is a perspective view showing one of the bail carrying ears and that part of the can or pail to which it is secured; and Figs. 4 to 9, are sectional views illustrating different methods of carrying out our invention.

The can shown in Figs. 1 and 2 illustrates that form of our invention in which the bail carrying ear is secured in place by the crimping of the outer edge of the can top upon the body of the can, A representing said can body, and B representing the top of the can. In the upper portion of each side of the body at the top of the same is formed a shallow recess $a$ as shown in Fig. 3, this recess being of such depth and such shape as to receive the bail carrying ear D, also shown in Fig. 3, this ear consisting of a piece of sheet metal of proper shape, preferably having struck up from it a cup $b$ with central opening for receiving the hooked lower end of the bail F, as shown in Fig. 2. In the recessed portion $a$ of the body of the can is also struck up a cup portion $b'$, which, in connection with the cup $b$ on the ear D, forms a chamber of sufficient size for the reception of the bent lower end of the bail, as shown in Fig. 2.

The upper portion of the ear D has laterally extending lugs $d$, these lugs being undercut on their lower sides as shown in Fig. 3, and the side walls of the recessed portion $a$ of the can body are recessed at the top as shown at $f$ in Fig. 3 for the reception of these lugs $d$ of the bail ear, so that said ear is firmly held in place before being finally secured. This securing of the ear within the recessed portion of the can body is effected in the can shown in Figs. 1 to 3 by crimping the outer edge of the can top B over the upper edge of the can body and the top of the bail ear, as shown at $g$, in Fig. 2, the result being that the bail ear is firmly secured in place, especially when the crimped edge of the top is soldered to the body by rotating the upper edge of the can in a solder bath or by other usual means, the line of flow of the solder in this case being indicated by the shaded portions at the top and bottom of the can in Fig. 1. Our invention can, however, be carried out in other ways besides that represented in Fig. 3, for instance in Fig. 4 we have shown a pail in which the bail ear is applied to the recessed upper portion of the body, and is held in place therein by rolling, turning, or bending its upper portion together with the upper portion of the can body to form a hollow bead or rim $m$ around the top of the can, and this hollow bead or rim may, if desired, be formed around a wire in case a wired-edge can or pail is desired.

In Fig. 5 we have shown a pail in which the bail ear is adapted to the recessed upper portion of the can body and is held in place by simply bending or folding down the upper edge of the can body over the top of the ear, the cupped portion of the ear in this case being of sufficient depth to receive the hooked or bent lower end of the bail so that no cup b' in the can body is required.

In Fig. 6 we have shown a can in which recessing of the body for the reception of the bail ear is rendered unnecessary by passing the upper portion of the bail ear through a slot in the body and bending it down on the inside of the same, as represented at h, the upper edge of the body being also, in this case, folded or turned down on the upper portion of the bail ear for additional security, and in Fig. 7 we have shown a somewhat similar construction, in which, however, a top B is used, the hooked upper portion of the bail ear being dropped into a slot i formed in the upper edge of the body and being prevented from rising in said slot by the crimped or downwardly bent edge or flange formed upon the top.

In Fig. 8 the top of the bail ear is shown as simply clamped between the flange of the top and the body of the can, and in Fig. 9 is shown a bail ear depending directly from the crimped flange of the can top, it being understood that in both of these latter cases, the upper portion of the bail ear is soldered to the body of the can, with the flange of the top.

In the claims we have used the generic term "bent" to include the various modifications of bending, folding or crimping, resorted to for the purpose of confining the bail ear to the body of the can.

Having thus described our invention, we claim and desire to secure by Letters Patent—

1. A sheet metal can or pail having a bail ear hung upon and supported against downward movement by engagement with the body thereof, and confined thereto by a bent-portion of said can or pail, substantially as specified.

2. A sheet metal can or pail having in the body a recess at or near the top, and a bail ear seated in said recess and confined thereto by a bent portion of the said can or pail, substantially as specified.

3. A sheet metal can or pail having in the body at or near the top a recess with cupped or dished portion, and a bail ear seated in said recess and confined thereto by a bent portion of the said can or pail, substantially as specified.

4. A sheet metal can or pail having notches in the upper edge of its body, and a bail ear having undercut projecting lugs adapted to said notches and retained therein by a bent portion of the can or pail top, substantially as specified.

5. A sheet metal can or pail having a top with rim or flange soldered to the body, and a bail ear confined to said rim or flange of the can top, and soldered to the body therewith, substantially as specified.

In testimony whereof we have signed our names to this specification in the presence of two subscribing witnesses.

HARRY T. PORTER.
JOS. HAAS.

Witnesses:
EUGENE ELTERICH,
HARRY SMITH.